US012382169B2

(12) United States Patent
Elangovan et al.

(10) Patent No.: US 12,382,169 B2
(45) Date of Patent: Aug. 5, 2025

(54) ACTIVATION OF FACIAL RECOGNITION

(71) Applicant: Ford Global Technologies, LLC, Dearborn, MI (US)

(72) Inventors: Vivekanandh Elangovan, Canton, MI (US); Ryan Edwin Hanson, Livonia, MI (US); John Robert Van Wiemeersch, Novi, MI (US); Brendan Francis Diamond, Grosse Pointe, MI (US); Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 41 days.

(21) Appl. No.: 18/058,899

(22) Filed: Nov. 28, 2022

(65) Prior Publication Data

US 2024/0179405 A1    May 30, 2024

(51) Int. Cl.
*H04N 23/667* (2023.01)
*G06V 10/22* (2022.01)
*G06V 40/16* (2022.01)
*H04N 7/18* (2006.01)
*H04N 23/611* (2023.01)
*H04N 23/90* (2023.01)

(52) U.S. Cl.
CPC ........... *H04N 23/667* (2023.01); *G06V 10/22* (2022.01); *G06V 40/166* (2022.01); *G06V 40/172* (2022.01); *H04N 7/188* (2013.01); *H04N 23/611* (2023.01); *H04N 23/90* (2023.01)

(58) Field of Classification Search
CPC .... H04N 23/667; H04N 23/90; H04N 23/611; H04N 7/188; G60V 40/166; G60V 10/22; G60V 40/172
See application file for complete search history.

(56) References Cited

U.S. PATENT DOCUMENTS

| 9,866,507 | B2 | 1/2018 | Frenkel et al. |
| 10,882,493 | B2 | 1/2021 | Foster et al. |
| 11,334,138 | B1 | 5/2022 | Mese et al. |

(Continued)

FOREIGN PATENT DOCUMENTS

| CN | 108229399 A | * 6/2018 |
| CN | 113516034 A | 10/2021 |

(Continued)

OTHER PUBLICATIONS

Wheeler et al., "Chapter 14—Face Recognition at a Distance", S.Z. Li, A.K. Jain (eds.), Handbook of Face Recognition, DOI 10.1007/978-0-85729-932-1_14, © Springer-Verlag London Limited 2011.

*Primary Examiner* — Maria E Vazquez Colon
(74) *Attorney, Agent, or Firm* — Frank Lollo; Brooks Kushman P.C.

(57) ABSTRACT

A computer includes a processor and a memory, and the memory stores instructions executable by the processor to receive range data from a range sensor of a vehicle, detect a person in proximity to the vehicle based on the range data, activate a camera of the vehicle upon detecting the person, set a parameter of one of the camera or a facial recognition algorithm based on the range data of the person, and perform the facial recognition algorithm on the person using data from the camera.

19 Claims, 3 Drawing Sheets

(56) References Cited

U.S. PATENT DOCUMENTS

| | | | |
|---|---|---|---|
| 2008/0191871 A1* | 8/2008 | Horak | G08B 13/1618 |
| | | | 367/136 |
| 2009/0080715 A1* | 3/2009 | van Beek | A61B 5/0059 |
| | | | 348/E7.087 |
| 2019/0135229 A1* | 5/2019 | Ledvina | H04W 12/50 |
| 2020/0327753 A1 | 10/2020 | Leiterer et al. | |
| 2021/0197755 A1* | 7/2021 | Nagasawa | B60R 21/36 |
| 2021/0250554 A1* | 8/2021 | Liu | H04N 7/181 |
| 2022/0157139 A1* | 5/2022 | Subramany | G08B 13/19613 |
| 2023/0184024 A1* | 6/2023 | Park | B60R 25/305 |
| | | | 701/49 |

FOREIGN PATENT DOCUMENTS

| | | | | |
|---|---|---|---|---|
| EP | 599291 A2 * | 6/1994 | | E05G 5/003 |
| KR | 20150141444 A * | 12/2015 | | |
| KR | 102407317 B1 | 6/2022 | | |
| WO | WO-2016190814 A1 * | 12/2016 | | G06K 9/00221 |
| WO | WO-2021164380 A1 * | 8/2021 | | B60R 25/25 |
| WO | WO-2022256204 A1 * | 12/2022 | | H04N 23/611 |
| WO | WO-2023220854 A1 * | 11/2023 | | |

\* cited by examiner

ACTIVATION OF FACIAL RECOGNITION

BACKGROUND

Vehicles typically include a variety of sensors. Some sensors detect the external world, e.g., objects and/or characteristics of surroundings of the vehicle, such as other vehicles, road lane markings, traffic lights and/or signs, pedestrians, etc. Such sensors include radar sensors, ultrasonic sensors, scanning laser range finders, light detection and ranging (lidar) devices, and image processing sensors such as cameras. Radar sensors can use direct propagation, i.e., measuring time delays between transmission and reception of radio waves, and/or indirect propagation, i.e., Frequency Modulated Continuous Wave (FMCW) method, i.e., measuring changes in frequency between transmitted and received radio waves. Ultrasonic sensors measure distances to features of the environment by emitting ultrasonic sound waves and converting the reflected sound into an electrical signal. A lidar device detects distances to objects by emitting laser pulses at a particular wavelength and measuring the time of flight for the pulse to travel to the object and back. Types of cameras include charge-coupled devices (CCD) and complementary metal oxide semiconductors (CMOS).

DETAILED DESCRIPTION

Figure 1:
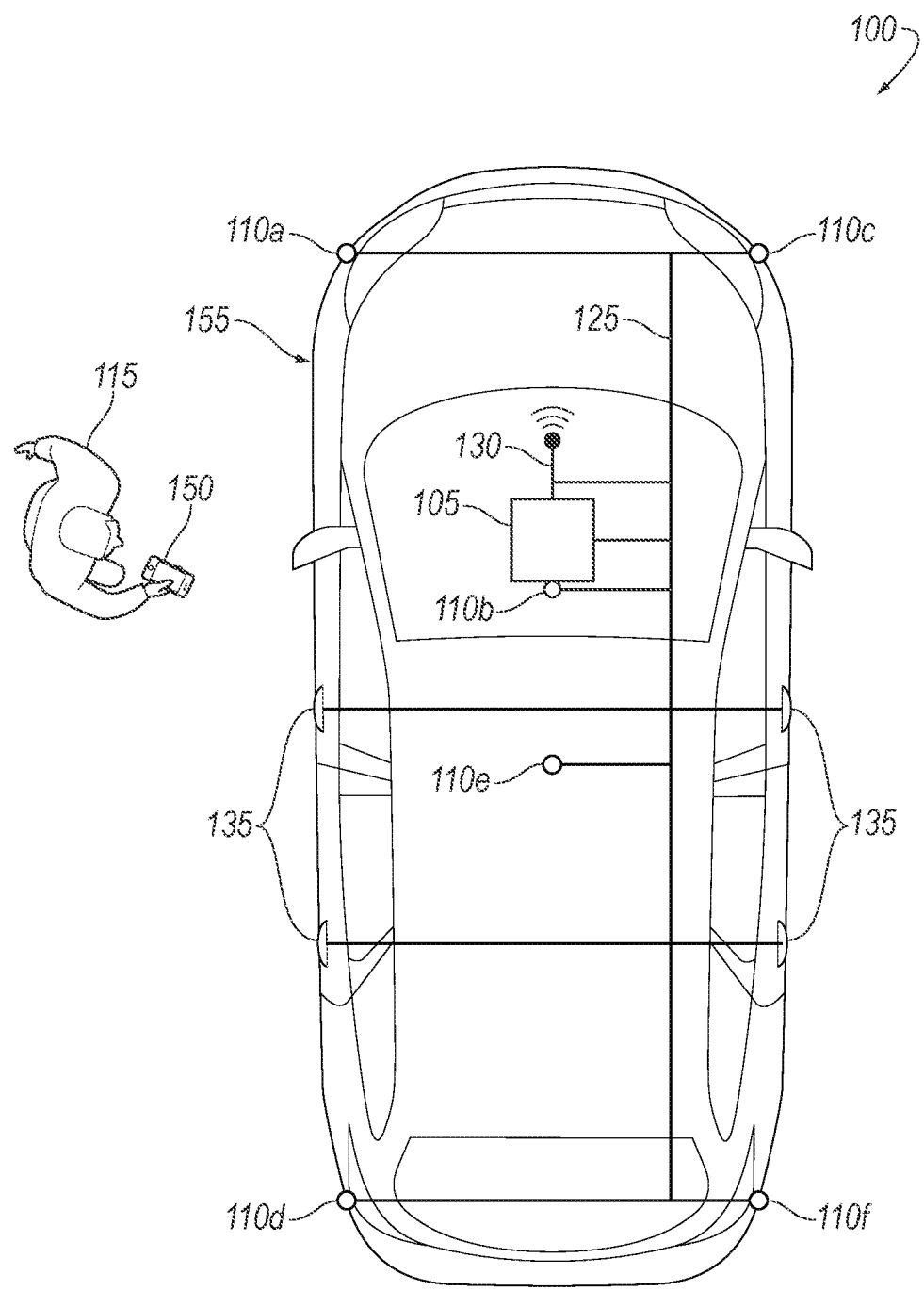
FIG. 1 is a top diagrammatic view of an example vehicle.

This disclosure pertains to techniques for activating a facial recognition algorithm for a vehicle. A vehicle may include features that are activated based on the facial recognition algorithm. Some of the features may be active while the vehicle is off, e.g., unlocking the doors of the vehicle upon determining with the facial recognition algorithm that a person outside the vehicle matches a stored identity. However, running the camera while the vehicle is off may drain batteries of the vehicle. The techniques herein may lower energy consumption while the vehicle is off. A computer of the vehicle is programmed to receive range data from a range sensor of the vehicle, detect a person in proximity to the vehicle based on the range data, activate a camera of the vehicle upon detecting the person, set a parameter of one of the camera or the facial recognition algorithm based on the range data of the person, and perform the facial recognition algorithm on the person using data from the camera. The range sensor may be, e.g., a radar sensor, a lidar sensor, an ultrasonic sensor, an Ultra-Wideband transceiver, etc. The parameter may be, e.g., a focal length of the camera, a region of the image frame on which to perform the facial recognition algorithm, a filter of potential matches for the facial recognition algorithm, etc. The system may lower energy consumption by keeping the camera off until needed for the facial recognition algorithm and by setting the parameter. For example, setting the parameter may reduce the processing necessary for performing the facial recognition algorithm.

A computer includes a processor and a memory, and the memory stores instructions executable by the processor to receive range data from a range sensor of a vehicle, detect a person in proximity to the vehicle based on the range data, activate a camera of the vehicle upon detecting the person, set a parameter of one of the camera or a facial recognition algorithm based on the range data of the person, and perform the facial recognition algorithm on the person using data from the camera.

In an example, the parameter may be a focal length of the camera.

In an example, the parameter may define the facial recognition algorithm. In a further example, the parameter may be a region of an image frame returned by the camera on which to perform the facial recognition algorithm. In a yet further example, the instructions may further include instructions to determine a position of the person from the range data, and to determine the region of the image frame from the position of the person.

In another yet further example, the instructions may further include instructions to determine a height of the person from the range data, and to determine the region of the image frame from the height of the person.

In another further example, the parameter may be a filter on potential matches for the facial recognition algorithm. In a yet further example, the instructions may further include instructions to determine a height of the person from the range data, and to filter potential matches for the facial recognition algorithm by heights of the potential matches.

In another yet further example, the instructions may further include instructions to determine a girth of the person from the range data, and to filter potential matches for the facial recognition algorithm by girths of the potential matches.

In an example, the instructions may further include instructions to determine a height of the person from the range data, and to set the parameter based on the height.

In an example, the camera may be a first camera, the vehicle may include a plurality of cameras including the first camera, and the instructions may further include instructions to select the first camera from the cameras to provide the data for the facial recognition algorithm based on the range data of the person. In a further example, the instructions may further include instructions to determine a position of the person from the range data, and the instructions to select the first camera may include instructions to select the first camera based on the position.

In another further example, the instructions may further include instructions to determine a height of the person from the range data, and the instructions to select the first camera may include instructions to select the first camera based on the height.

In another further example, the instructions may further include instructions to determine a velocity vector of the person from the range data, and the instructions to select the first camera may include instructions to select the first camera based on the velocity vector.

In another further example, the instructions may further include instructions to, upon selecting the first camera, activate the first camera from a sleep mode.

In an example, the instructions may further include instructions to establish a connection between the vehicle and a mobile device of the person, and to increase a pulse rate of the range sensor to collect the range data in response to establishing the connection.

In an example, the range sensor may be an Ultra-Wideband transceiver, and the instructions may further include instructions to establish a negotiation between the Ultra-Wideband transceiver and a mobile device.

In an example, the instructions may further include instructions to determine with the facial recognition algorithm that the person matches a stored identity, and upon determining that the person matches the stored identity, actuate a component of the vehicle.

In an example, the range sensor may be one of a radar sensor, an ultrasonic sensor, or an Ultra-Wideband transceiver.

A method includes receiving range data from a range sensor of a vehicle, detecting a person in proximity to the vehicle based on the range data, activating a camera of the vehicle upon detecting the person, setting a parameter of one of the camera or a facial recognition algorithm based on the range data of the person, and performing the facial recognition algorithm on the person using data from the camera.

With reference to the Figures, wherein like numerals indicate like parts throughout the several views, a computer 105 includes a processor and a memory, and the memory stores instructions executable by the processor to receive range data from a range sensor 110 of a vehicle 100, detect a person 115 in proximity to the vehicle 100 based on the range data, activate a camera 120 of the vehicle 100 upon detecting the person 115, set a parameter of one of the camera 120 or a facial recognition algorithm based on the range data of the person 115, and perform the facial recognition algorithm on the person 115 using data from the camera 120.

With reference to FIG. 1, the vehicle 100 may be any passenger or commercial automobile such as a car, a truck, a sport utility vehicle, a crossover, a van, a minivan, a taxi, a bus, etc.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

Figure 2:
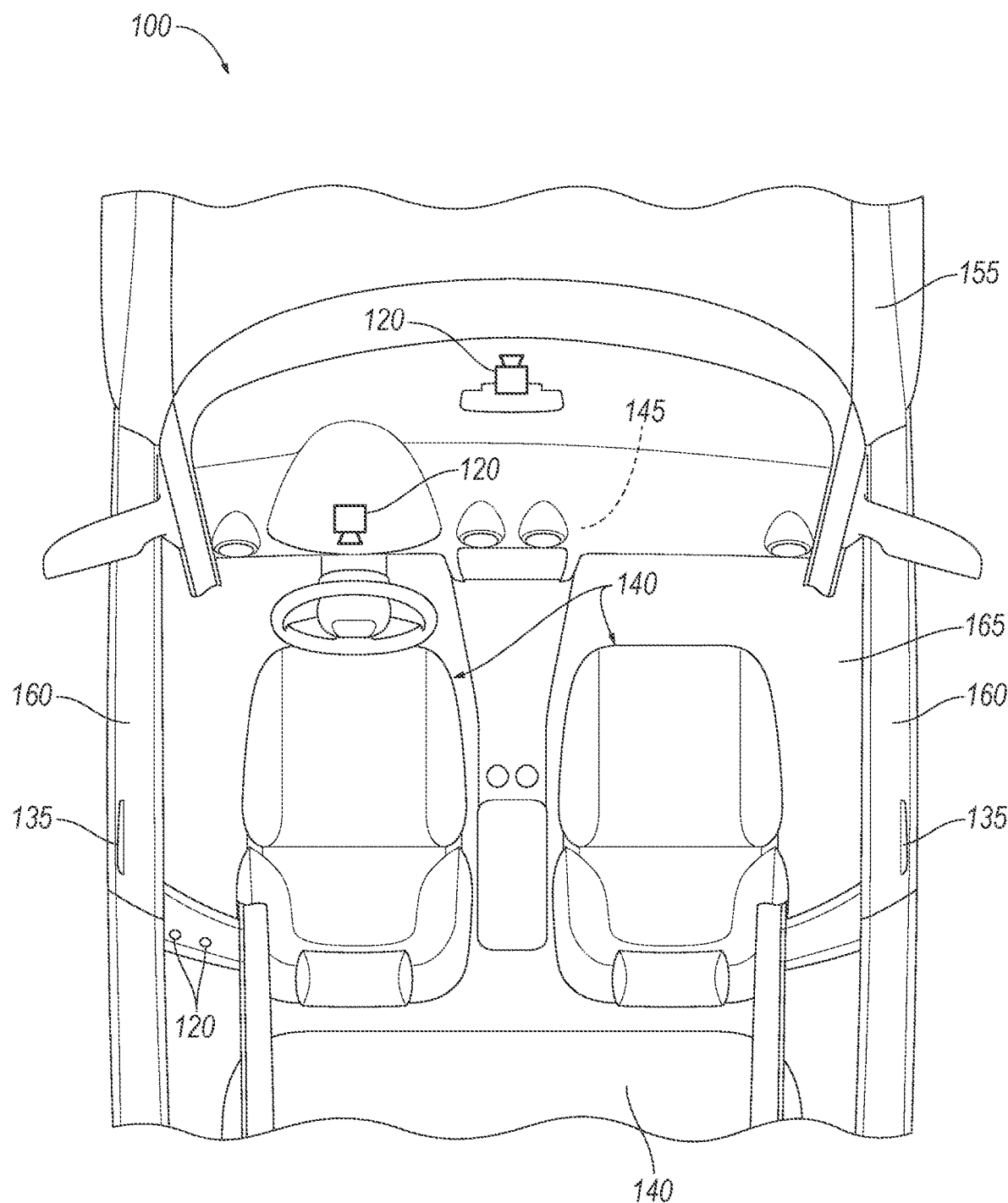
FIG. 2 is a top diagrammatic view of a portion of the vehicle with a passenger cabin exposed for illustration.

The computer 105 may transmit and receive data through a communications network 125 such as a controller area network (CAN) bus, Ethernet, WiFi, Local Interconnect Network (LIN), onboard diagnostics connector (OBD-II), and/or by any other wired or wireless communications network. The computer 105 may be communicatively coupled to the range sensors 110 and a first transceiver 130, as shown in FIG. 1; to the cameras 120, door locks 135, seats 140, and a climate-control system 145, as shown in FIG. 2; and to other components via the communications network 125.

The range sensors 110 return the range data by detecting distances and respective directions to objects and features of the surrounding environment. For the purposes of this disclosure, "range data" is defined as the data returned by a range sensor. The range data may be a point cloud, i.e., a collection of defined points in space. Each point in the point cloud may be specified in three dimensions, e.g., a distance from the sensor to the point, an azimuthal angle, and an elevation angle; Cartesian coordinates; etc. The computer 105 may convert the range data from a reference frame of the respective range sensor 110 to a reference frame relative to the vehicle 100 or relative to the environment.

For example, the range sensors 110 may include radar sensors, lidar sensors, ultrasonic sensors, and/or Ultra-Wideband (UWB) transceivers. Radar sensors transmit radio waves and receive reflections of those radio waves to detect physical objects in the environment. The radar sensors can use direct propagation, i.e., measuring time delays between transmission and reception of radio waves, and/or indirect propagation, i.e., Frequency Modulated Continuous Wave (FMCW) method, i.e., measuring changes in frequency between transmitted and received radio waves. A lidar sensor detects distances to objects by emitting laser pulses at a particular wavelength and measuring the time of flight for the pulse to travel to the object and back. The lidar sensor can be any suitable type for providing the lidar data on which the computer 105 can act, e.g., spindle-type lidar, solid-state lidar, flash lidar, etc. Ultrasonic sensors measure distances to features of the environment by emitting ultrasonic sound waves and converting the reflected sound into an electrical signal.

As UWB transceivers, the range sensors 110 behave as radar sensors, i.e., transmit radio waves and receive reflections of those radio waves to detect physical objects in the environment. UWB transceivers also communicate wirelessly with mobile devices 150 using radio waves. The UWB transceivers use an ultra-wideband signal, e.g., a signal with a low energy level spread over a large range of the radio spectrum. The Federal Communications Commission and the International Telecommunications Union Radiocommunication Sector define ultra-wideband as an antenna transmission for which emitted signal bandwidth exceeds the lesser of 500 MHz or 20% of the arithmetic center frequency. The UWB transceivers may use any suitable modulation method, e.g., orthogonal frequency-division multiplexing (OFDM), phase-shift keying (PSK), pulse-position modulation (PPM), etc. Using the UWB transceivers as the range sensors 110 may be beneficial because the UWB transceivers may be active while the vehicle 100 is off for the purpose of communicating with mobile devices 150, thereby keeping the additional energy consumption for generating the range data low.

The range sensors 110 are mounted to a body 155 of the vehicle 100. The number of range sensors 110 that are UWB transceivers may be at least four, e.g., six. As shown in the example of FIG. 1, the range sensors 110 include a first range sensor 110a, a second range sensor 110b, a third range sensor 110c, a fourth range sensor 110d, a fifth range sensor 110e, and a sixth range sensor 110f. The range sensors 110, e.g., UWB transceivers, are spaced apart from each other, e.g., spread over the body 155 of the vehicle 100, to increase the ability to distinguish a location when used for trilateration. For example, four of the UWB transceivers may be located at respective corners of the vehicle 100 to maximize the horizontal spread of the UWB transceivers, and the remaining two transceivers may be located internally to a footprint of the vehicle 100 at different heights than the corner-mounted UWB transceivers to provide a vertical spread.

The first transceiver 130 may be adapted to transmit signals wirelessly through a different communication protocol than what is used by the UWB transceivers, such as cellular, Bluetooth®, Bluetooth® Low Energy (BLE), WiFi, IEEE 802.11a/b/g/p, cellular-V2X (CV2X), Dedicated Short-Range Communications (DSRC), etc. The first transceiver 130 is adapted to communicate using a protocol that is also used by the mobile device 150. In particular, the first transceiver 130 may use BLE. The first transceiver 130 may be one device or may include a separate transmitter and receiver.

The UWB transceivers and the first transceiver 130 may communicate with at least one mobile device 150. The mobile devices 150 are portable computing devices such as smart keyfobs; mobile phones, e.g., smartphones; wearable devices, e.g., smartwatches, headsets, etc.; or tablets. The mobile devices 150 are computing devices including respective processors and respective memories. The mobile devices 150 may be owned and carried by respective persons 115 who may be operators and/or owners of the vehicle 100.

With reference to FIG. 2, the cameras 120 can detect electromagnetic radiation in some range of wavelengths. For example, the cameras 120 may detect visible light, infrared radiation, ultraviolet light, or some range of wavelengths including visible, infrared, and/or ultraviolet light. For example, the cameras 120 can be a charge-coupled devices (CCD), complementary metal oxide semiconductors (CMOS), or any other suitable type.

The cameras 120 are mounted to the vehicle 100. The cameras 120 are typically arranged in positions to detect persons 115 in the vicinity of the vehicle 100, e.g., occupants and/or pedestrians. For example, the cameras 120 can include a camera 120 with a field of view encompassing an area in front of the vehicle 100. The camera 120 can be mounted on or above a rear-view mirror and aimed in a vehicle-forward direction. For another example, the cameras 120 can include a camera 120 with a field of view encompassing an operator of the vehicle 100. The camera 120 can be mounted to an instrument panel and aimed in a vehicle-rearward direction. The camera 120 can be arranged to include one or more occupants, e.g., only the operator, or all the occupants, etc., of the passenger cabin 165. For another example, the cameras 120 can include a camera 120 with a field of view encompassing an area next to the doors 160 of the vehicle 100. One or more cameras 120 can be mounted to a B-pillar of the vehicle 100 and aimed in a vehicle-lateral direction. A person 115 approaching the door will be in the field of view of the camera 120. The cameras 120 may include cameras 120 aimed at a plurality of heights, e.g., each B pillar may have two cameras 120 aimed at different heights.

The door locks 135 are engageable to permit or prevent doors 160 of the vehicle 100 from being opened. The door locks 135 are movable between a disengaged position, in which the doors 160 are unlocked, i.e., permitted to open if the door handle is operated, and an engaged position, in which the doors 160 are locked, i.e., prevented from opening even if the door handle is operated.

The vehicle 100 includes a passenger cabin 165 to house occupants, if any, of the vehicle 100. The passenger cabin 165 includes one or more of the seats 140 disposed in a front row of the passenger cabin 165 and one or more of the seats 140 disposed in a second row behind the front row. The passenger cabin 165 may also include seats 140 in a third-row (not shown) at a rear of the passenger cabin 165. The seats 140 are shown to be bucket seats in the front row and bench seats in the second row, but the seats 140 may be other types. The position and orientation of the seats 140 and components thereof may be adjustable by an occupant.

Each seat 140 can include actuators for adjusting the seat 140 in multiple degrees of freedom, e.g., a tilt of the seat 140, a height of the seat 140, a recline angle of the seat 140, or a lumbar support position of the seat 140. The tilt of the seat 140 is an angle of a seat bottom of the seat 140 relative to the passenger cabin 165 about a lateral axis, i.e., a pitch of the seat bottom. The height of the seat 140 is a vertical distance of a reference point on the seat bottom relative to the passenger cabin 165. The recline angle of the seat 140 is an angle of a seat back of the seat 140 relative to the seat bottom. The lumbar support position is a vehicle-forward position of a lumbar support bar (not shown), located in the seat back, relative to the seat back. Additionally or alternatively, the seat 140 may be adjustable in other degrees of freedom.

The climate-control system 145 provides heating and/or cooling to the passenger cabin 165 of the vehicle 100. The climate-control system 145 may include a compressor, a condenser, a receiver-dryer, a thermal-expansion valve, an evaporator, blowers, fans, ducts, vents, vanes, temperature sensors, and other components that are known for heating or cooling vehicle interiors. The climate-control system 145 may operate to cool the passenger cabin 165 by transporting a refrigerant through a heat cycle to absorb heat from the passenger cabin 165 and expel the heat from the vehicle 100, as is known. The climate-control system 145 may include a heater core that operates as a radiator for an engine of the vehicle 100 by transferring some waste heat from the engine into the passenger cabin 165, as is known. The climate-control system 145 may include an electrically powered heater such as a resistive heater, positive-temperature-coefficient heater, electrically powered heat pump, etc.

Returning to FIG. 1, the computer 105 may be programmed to establish a connection between the vehicle 100 and at least one mobile device 150, e.g., using the first transceiver 130. The connection may include negotiations between each UWB transceiver and each mobile device 150. Each negotiation identifies the UWB transceiver to the mobile device 150 and then identifies the mobile device 150 to the UWB transceiver, permitting signals to be transmitted between the UWB transceiver and the mobile device 150. The computer 105 may establish respective connections with multiple mobile devices 150 if multiple mobile devices 150 are within range of the first transceiver 130.

The computer 105 may be programmed to determine distance data to at least one mobile device 150 from some or all of the UWB transceivers as a result of the negotiations (i.e., not from the UWB transceivers behaving as radar sensors). The distance data may include respective distances from the UWB transceivers to the at least one mobile device 150. For example, the mobile device 150 may transmit a query, and a UWB transceiver may, in response to receiving the query, transmit a response to the mobile device 150, possibly with other steps performed and/or messages sent between the query and the response. Alternatively, a UWB transceiver may transmit a query, and the mobile device 150 may, in response to receiving the query, transmit a response to that UWB transceiver. The computer 105 may determine a distance from the UWB transceiver to the mobile device 150 based on the time between transmitting the query and receiving the response and a known speed at which the transmissions travel.

The computer 105 may be programmed to perform a trilateral calculation on the distance data for the mobile device 150. A trilateral calculation includes determining location information for an unknown point based on distances from known points. Specifically, the location of the unknown point may be an intersection of at least three spheres with known radiuses and center points. The location of the mobile device 150 may be the unknown point, and each sphere is defined by the known location of a UWB transceiver and the known distance from that UWB transceiver to the mobile device 150. The computer 105 may determine the location of the mobile device 150 using known algorithms for solving three quadratic equations with three unknown variables.

The computer 105 may be programmed to set a pulse rate of the range sensors 110, e.g., the UWB transceivers. The pulse rate indicates how frequently the range sensor 110 transmits a pulse to reflect off of the environment and gather the range data. The pulse may be radio waves if the range sensor 110 is a radar sensor or UWB transceiver, laser beams if the range sensor 110 is a lidar sensor, or ultrasonic sound waves if the range sensor 110 is an ultrasonic sensor. The range sensor 110 may have a variable pulse rate. For example, the range sensor 110 may have a low pulse rate (i.e., less frequent pulses) and a high pulse rate (i.e., more frequent pulses). The range sensor 110 may consume more energy when operating at a higher pulse rate. The computer 105 may transmit an instruction to the range sensor 110 over the communications network 125 indicating the pulse rate, e.g., indicating the high pulse rate or the low pulse rate. The low pulse rate may be a default pulse rate, i.e., a pulse rate at which the range sensor 110 operates in the absence of an instruction from the computer 105. The low pulse rate may be zero, i.e., the range sensor 110 is not collecting range data, or the low pulse may be positive. The range sensor 110 may have different default pulse rates depending on whether the vehicle 100 is on or off, e.g., the high pulse rate when the vehicle 100 is on and the low pulse rate when the vehicle 100 is off.

The computer 105 may be programmed to increase the pulse rate, e.g., set the pulse rate at the high pulse rate, in response to a trigger. The computer 105 may increase the pulse rate by activating the range sensor 110 to collect range data when the range sensor 110 is not collecting the range data. The computer 105 may increase the pulse rate by changing the pulse rate from the low pulse rate to the high pulse rate, e.g., when the low pulse rate is positive. The computer 105 is programmed to receive the range data from the range sensor 110 when the pulse rate is positive.

For example, the trigger may be that a distance to a person 115 is below a threshold distance. The threshold distance may be chosen to indicate that a person 115 is able to be within range of the camera 120 for facial recognition in no more than a time to receive and process the range data and activate the camera 120. The distance may be determined from the UWB transceiver communicating with the mobile device 150, as described above. Alternatively or additionally, the distance may be determined from GPS data received from the mobile device 150, e.g., via the first transceiver 130, possibly via an external network. The computer 105 may calculate a distance between a GPS location of the mobile device 150 and a GPS location of the vehicle 100, known from a GPS sensor of the vehicle 100. Alternatively or additionally, the distance may be determined from the range data returned by the range sensor 110 if the range sensor 110 is operating at the low pulse rate and the low pulse rate is positive.

For another example, the trigger may be the establishment of the connection between the vehicle 100 and the mobile device 150, as described above. The establishment of the connection indicates that the mobile device 150 is within the range of the first transceiver 130, e.g., within the range of BLE.

For another example, the trigger may be that a signal strength of the mobile device 150 is above a threshold signal strength. The first transceiver 130 may return a received signal strength indicator (RSSI) value as a result of executing BLE, as is known, low-frequency (LF) communications, etc. The threshold signal strength may be chosen to indicate that a person 115 is able to be within range of the camera 120 for facial recognition in no more than a time to receive and process the range data and activate the camera 120.

For another example, the trigger may be a time and/or location of the vehicle 100. The trigger may be that a time of day is within a time-of-day window stored in the memory of the computer 105. The time-of-day window includes a start time and an end time, and the trigger occurs if the time of day is between the start time and the end time. The time-of-day window may be chosen based on frequent use of the vehicle 100 by the operator at that time, e.g., around a typical beginning time of a commute. The trigger may be that a location of the vehicle 100, e.g., as known from a GPS sensor of the vehicle 100, is within a geofenced area stored in the memory of the computer 105. The trigger may be that a time is within a time window when the vehicle 100 is within a geofenced location. The location may be a frequently visited location, and the corresponding time window may encompass a typical time that the operator of the vehicle 100 spends at the location, e.g., fifteen to forty-five minutes since parking at a grocery store.

The computer 105 is programmed to detect a person 115 in proximity to the vehicle 100 based on the range data. For example, the computer 105 may identify an object in the range data having a height and a width within intervals chosen to indicate a person 115, e.g., 4.5-7.5 feet for height and 1-3 feet for width. The identification may be restricted to objects that are moving. For another example, the computer 105 may detect the person 115 using a machine-learning program, e.g., a convolutional neural network programmed to accept point clouds as input and output an identified object. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a down-sampling operation along spatial dimensions; and fully connected layers, which generate based on the output of all neurons of the previous layer. The final layer of the convolutional neural network generates a score for each potential type of object, and the final output is the type with the highest score. The computer 105 detects a person 115 if the type with the highest score is "person."

The computer 105 may be programmed to determine one or more characteristics of the person 115 from the range data. The characteristics may include, e.g., a position of the person 115, a height of the person 115, a girth of the person 115, and/or a velocity vector of the person 115. The position may be determined from the points of the range data that are part of the object identified as the person 115. For example, each point corresponds to a position in space, and the position of the person 115 may be an average of the positions of the points. Alternatively, the position may be halfway between the two horizontally farthest apart points. Alternatively, the computer 105 may perform a trilateral calculation on the mobile device 150 as described above. The height may be determined from the points of the range data that are part of the object identified as the person 115. For example, the height may be a distance of a highest point from the ground. The girth may be determined from the points of the range data that are part of the object identified as the person 115. For example, the girth may be a distance separating the laterally farthest-apart points at a height corresponding to a waist of the person 115. Alternatively or additionally, the girth may be determined using a machine-learning program, e.g., a regressor trained to receive the point cloud as an input and output the girth. The velocity vector may be determined from the points of the range data that are part of the object identified as the person 115 over time. For example, the velocity vector may be a position-change vector from the position of the person 115 at a first time to the position of the person 115 at a second time, divided by the change in time from the first time to the second time.

The computer 105 may be programmed to select one of the cameras 120 to provide the data for the facial recognition algorithm based on the range data of the person 115, e.g., based on the characteristics of the person 115. The selected camera 120 will be referred to as a first camera 120 to differentiate from the other cameras 120. The computer 105 may select the first camera 120 based on the position of the person 115. For example, the first camera 120 may be selected because the first camera 120 has a field of view encompassing the position of the person 115. The computer 105 may select the first camera 120 based on the height of the person 115. For example, the first camera 120 may be selected because the first camera 120 has a field of view encompassing a highest point of the person 115, i.e., the head of the person 115. The computer 105 may select the first camera 120 based on the velocity vector of the person 115. For example, the first camera 120 may be selected because the first camera 120 has a field of view encompassing a future position of the person 115. The computer 105 may select the first camera 120 based on a combination of the position, the height, and the velocity vector. For example, the computer 105 may select the first camera 120 because the first camera 120 has a field of view encompassing a three-dimensional position of the head of the person 115 at a future time at which the first camera 120 will be activated.

The computer 105 is programmed to activate the first camera 120 upon detecting the person 115. For example, in response to detecting the person 115, the computer 105 may select the first camera 120 as described above and then activate the first camera 120. The computer 105 may activate the first camera 120 from a sleep mode. The first camera 120 in the sleep mode does not return image data. Activating the first camera 120 shifts the first camera 120 from the sleep mode to an active mode, in which the first camera 120 does return image data. The first camera 120 in the active mode has a higher power draw than the first camera 120 in the sleep mode. The computer 105 may be programmed to put the cameras 120 in the sleep mode in response to the vehicle 100 turning off. The computer 105 may leave the cameras 120 in the sleep mode while the vehicle 100 is off unless a condition for activation occurs, such as detecting the person 115.

The computer 105 may be programmed to set a parameter of the first camera 120 based on the range data of the person 115. For example, the computer 105 may set a focal length of the first camera 120. The focal length is the inverse of the optical power of a camera 120. Higher focal length corresponds to higher magnification and a narrower angle of view, and shorter focal length corresponds to lower magnification and a wider angle of view. The computer 105 may set the focal length based on the characteristics of the person 115, as indicated by the range data, e.g., the position, the height, and/or the velocity vector. For example, the computer 105 may set the focal length higher when the range data indicates that the head of the person 115 is (or will be) closer to a center of the field of view of the first camera 120, and the computer 105 may set the focal length shorter when the range data indicates that the head of the person 115 is (or will be) farther from the center of the field of view.

The computer 105 may be programmed to receive image data from the first camera 120. The image data are a sequence of image frames of the field of view of the first camera 120. Each image frame is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image frame, i.e., position in the field of view of the sensor at the time that the image frame was recorded, can be specified in pixel dimensions or coordinates, e.g., an ordered pair of pixel distances, such as a number of pixels from a top edge and a number of pixels from a left edge of the image frame.

The computer 105 is programmed to perform the facial recognition algorithm on the person 115 using data from the camera 120. The computer 105 can perform the facial recognition algorithm to determine whether the person 115, i.e., the face of the person 115, matches a stored identity, i.e., a face stored in memory of a known individual such as an owner or operator of the vehicle 100. The computer 105 may use any suitable facial recognition algorithm, e.g., template matching; statistical techniques such as principal component analysis (PCA), discrete cosine transform, linear discriminant analysis, locality preserving projections, Gabor wavelet, independent component analysis, or kernel PCA; neural networks such as neural networks with Gabor filters, neural networks with Markov models, or fuzzy neural networks; etc.

The facial recognition algorithm has one or more parameters. The parameters define the facial recognition algorithm, e.g., aspects of the performance of the facial recognition algorithm. For example, the parameters may include a region of an image frame on which to perform the facial recognition algorithm, a filter on potential matches for the facial recognition algorithm, etc.

The computer 105 may be programmed to set at least one parameter of the facial recognition algorithm based on the range data of the person 115. The computer 105 may set the parameter(s) based on the characteristics of the person 115, as indicated by the range data, e.g., the position, the height, the girth, and/or the velocity vector.

For example, the parameter may include a region of an image frame returned by the camera 120 on which to perform the facial recognition algorithm. The region is a contiguous subset of the image frame. The region may be, e.g., rectangular and defined by pixel dimensions of top, left, bottom, and right edges. The computer 105 may set the region of the image frame based on the characteristics of the person 115, as indicated by the range data, e.g., the position, the height, and/or the velocity vector. The computer 105 may set the top and bottom edges based on the height and possibly also on the velocity vector, e.g., to vertically encompass the head of the person 115 or where the head will be once the image frame is received. The computer 105 may set the left and right edges based on the position and possibly also on the velocity vector, e.g., to horizontally encompass the head of the person 115 or where the head will be once the image frame is received.

For another example, the parameter may include a filter on potential matches for the facial recognition algorithm. The potential matches are the stored identities to which the facial recognition compares the face from the image data. The memory of the computer 105 may store the potential matches. The memory of the computer 105 may store characteristics paired with the potential matches. The characteristics are characteristics of the persons 115 to which potential matches correspond, e.g., height, weight, girth, etc. The computer 105 may filter the potential matches by the heights and/or by the girths. For example, the computer 105 may select the potential matches with heights within a preset margin of the height indicated by the range data. For another example, the computer 105 may select the potential matches with girths or weights within a preset margin of the girth indicated by the range data. The computer 105 may store a formula or lookup table converting between weight and girth if the potential matches have weights stored instead of girths. The preset margins may be chosen based on a measurement noise of the range sensors 110. After applying the filter, the facial recognition algorithm may compare the potential matches that passed through the filter to the image data and not the potential matches that were filtered out by the filter to the image data.

The computer 105 may be programmed to actuate at least one of the components of the vehicle 100 upon determining that the person 115 matches one of the stored identities. For example, the computer 105 may instruct the door locks 135 to unlock. For another example, the computer 105 may adjust one of the seats 140 to a predetermined arrangement. The predetermined arrangement can be stored in memory paired with the matched stored identity. For another example, the computer 105 may activate the climate-control system 145.

Figure 3:
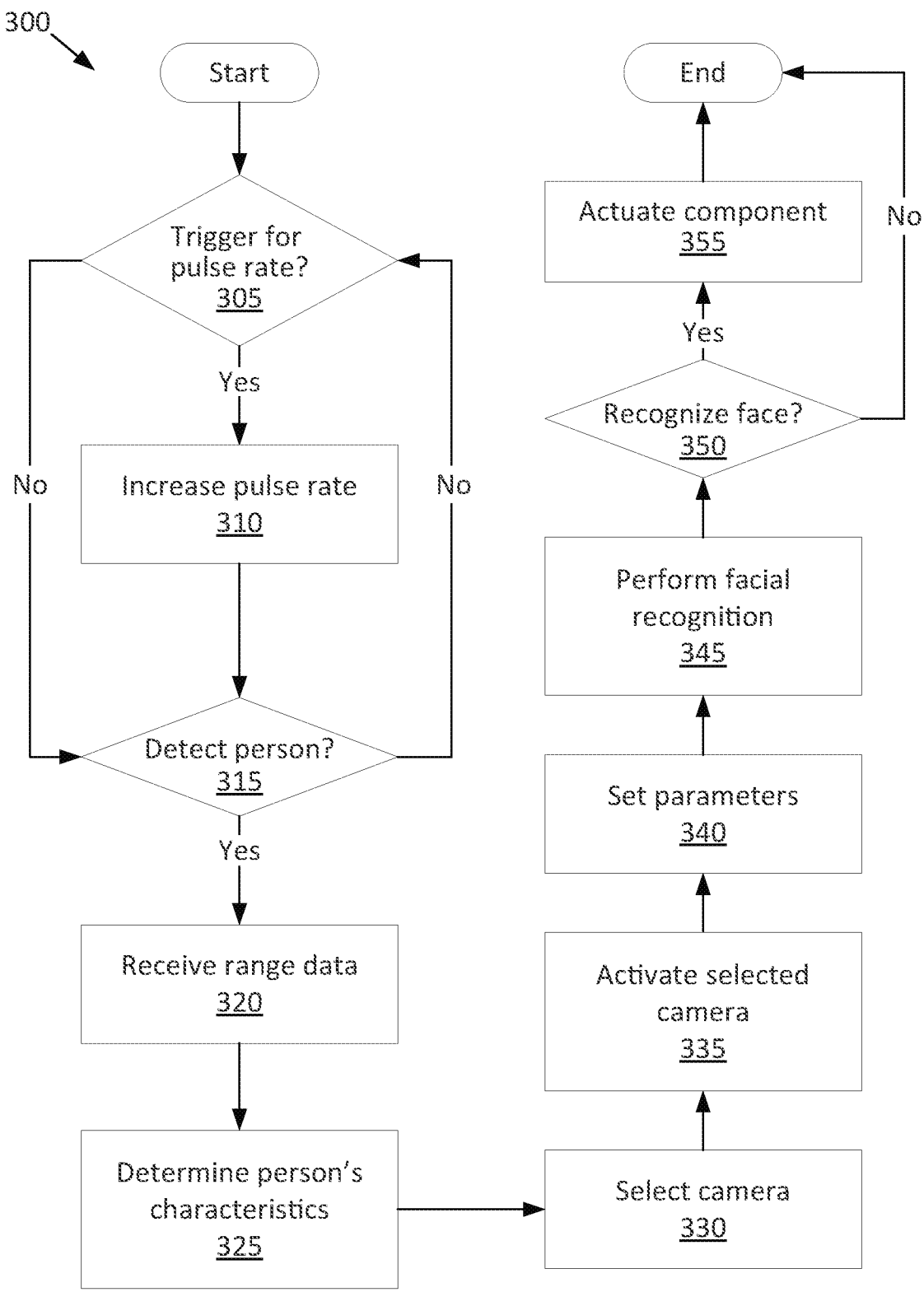
FIG. 3 is a process flow diagram of an example process for performing a facial recognition algorithm by the vehicle.

FIG. 3 is a process flow diagram illustrating an example process 300 for performing the facial recognition algorithm. The memory of the computer 105 stores executable instructions for performing the steps of the process 300 and/or programming can be implemented in structures such as mentioned above. The process 300 may execute when the vehicle 100 is off. In other words, the steps of the process 300 may be conditional on the vehicle 100 being off. Alternatively, the process 300 may execute both when the vehicle 100 is on and when the vehicle 100 is off. As a general overview of the process 300, the computer 105 increases the pulse rate in response to a trigger. Upon detecting a person 115 in proximity to the vehicle 100 based on the range data, the computer 105 receives the range data, determines the characteristics of the person 115, selects the first camera 120, activates the first camera 120, sets the parameters, and performs the facial recognition algorithm. Upon determining that the person 115 matches one of the stored identities, the computer 105 actuates a component of the vehicle 100.

The process 300 begins in a decision block 305, in which the computer 105 determines whether a trigger for increasing the pulse rate has occurred, as described above. In response to a trigger occurring, the process 300 proceeds to a block 310. Otherwise, the process 300 proceeds to a decision block 315.

In the block 310, the computer 105 increases the pulse rate of the range sensor 110, as described above. After the block 310, the process 200 proceeds to the decision block 315.

In the decision block 315, the computer 105 detects whether a person 115 is in proximity to the vehicle 100 based on the range data, as described above. Upon detecting a person 115 in proximity to the vehicle 100, the process 300 proceeds to a block 320. Otherwise, the process 300 returns to the decision block 305 to continue waiting for a trigger.

In the block 320, the computer 105 receives the range data from the range sensor 110.

Next, in a block 325, the computer 105 determines the characteristics of the person 115, as described above.

Next, in a block 330, the computer 105 selects the first camera 120 based on the range data of the person 115, as described above.

Next, in a block 335, the computer 105 activates the first camera 120 from the sleep mode, as described above.

Next, in a block 340, the computer 105 sets the parameter of the camera 120 and/or the facial recognition algorithm based on the range data of the person 115, as described above.

Next, in a block 345, the computer 105 receives data from the camera 120 and performs the facial recognition algorithm on the person 115 using the data from the camera 120, as described above.

Next, in a decision block 350, the computer 105 determines with the facial recognition algorithm whether the person 115 matches a stored identity. Upon determining that the person 115 matches one of the stored identities, the process 300 proceeds to a block 355. Otherwise, the process 300 ends.

In the block 355, the computer 105 actuates a component of the vehicle 100, as described above. After the block 355, the process 300 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising:
a processor and a memory, the memory storing instructions executable by the processor to:
receive range data from a range sensor of a vehicle;
detect a person in proximity to the vehicle based on the range data;
activate a camera of the vehicle upon detecting the person;
set a parameter defining performance of a facial recognition algorithm during execution of the facial recognition algorithm, wherein the parameter is set based on the range data of the person; and
perform the facial recognition algorithm on the person using data from the camera.

2. The computer of claim 1, wherein the instructions further include instructions to set a second parameter, and the second parameter is a focal length of the camera.

3. The computer of claim 1, wherein the parameter is a region of an image frame returned by the camera on which to perform the facial recognition algorithm.

4. The computer of claim 3, wherein the instructions further include instructions to determine a position of the person from the range data, and to determine the region of the image frame from the position of the person as indicated by the range data.

5. The computer of claim 3, wherein the instructions further include instructions to determine a height of the person from the range data, and to determine the region of the image frame from the height of the person.

6. The computer of claim 1, wherein the parameter is a filter on potential matches for the facial recognition algorithm, the filter being set based on the range data of the person.

7. The computer of claim 6, wherein the instructions further include instructions to determine a height of the person from the range data, and to filter potential matches for the facial recognition algorithm by heights of the potential matches.

8. The computer of claim 6, wherein the instructions further include instructions to determine a girth of the person from the range data, and to filter potential matches for the facial recognition algorithm by girths of the potential matches.

9. The computer of claim 1, wherein the instructions further include instructions to determine a height of the person from the range data, and to set the parameter based on the height.

10. The computer of claim 1, wherein the camera is a first camera, the vehicle includes a plurality of cameras including the first camera, and the instructions further include instructions to select the first camera from the cameras to provide the data for the facial recognition algorithm based on the range data of the person.

11. The computer of claim 10, wherein the instructions further include instructions to determine a position of the person from the range data, and the instructions to select the first camera include instructions to select the first camera based on the position.

12. The computer of claim 10, wherein the instructions further include instructions to determine a height of the person from the range data, and the instructions to select the first camera include instructions to select the first camera based on the height.

13. The computer of claim 10, wherein the instructions further include instructions to determine a velocity vector of the person from the range data, and the instructions to select the first camera include instructions to select the first camera from the cameras based on the velocity vector.

14. The computer of claim 10, wherein the instructions further include instructions to, upon selecting the first camera, activate the first camera from a sleep mode.

15. The computer of claim 1, wherein the instructions further include instructions to establish a connection between the vehicle and a mobile device of the person, and to increase a pulse rate of the range sensor to collect the range data in response to establishing the connection.

16. The computer of claim 1, wherein the range sensor is an Ultra-Wideband transceiver, and the instructions further include instructions to establish a negotiation between the Ultra-Wideband transceiver and a mobile device.

17. The computer of claim 1, wherein the instructions further include instructions to determine with the facial recognition algorithm that the person matches a stored identity, and upon determining that the person matches the stored identity, actuate a component of the vehicle.

18. The computer of claim 1, wherein the range sensor is one of a radar sensor, an ultrasonic sensor, or an Ultra-Wideband transceiver.

19. A method comprising:
receiving range data from a range sensor of a vehicle;
detecting a person in proximity to the vehicle based on the range data;
activating a camera of the vehicle upon detecting the person;
setting a parameter defining performance of a facial recognition algorithm during execution of the facial recognition algorithm, wherein the parameter is set based on the range data of the person; and
performing the facial recognition algorithm on the person using data from the camera.

* * * * *